Aug. 28, 1928.
A. KINZBACH
TANK GAUGING APPARATUS
Filed Sept. 16, 1924        2 Sheets-Sheet 1
1,682,286
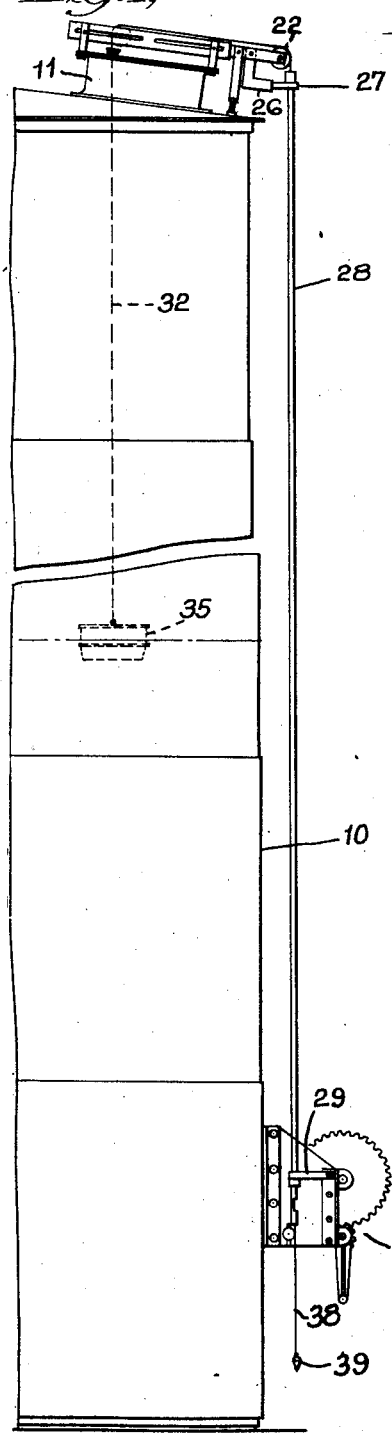
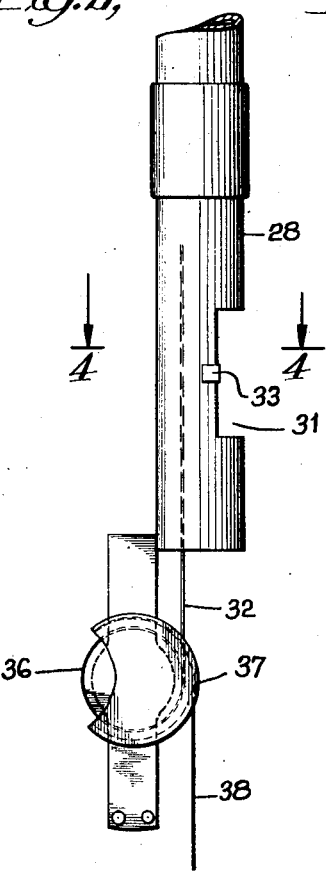
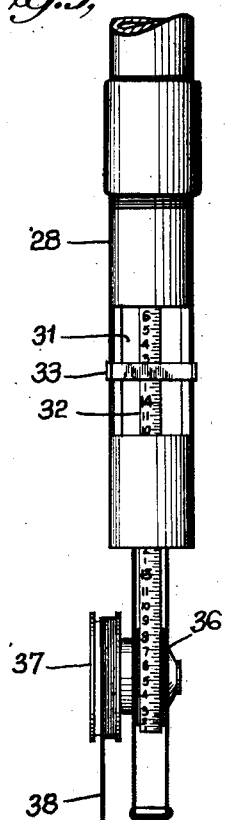
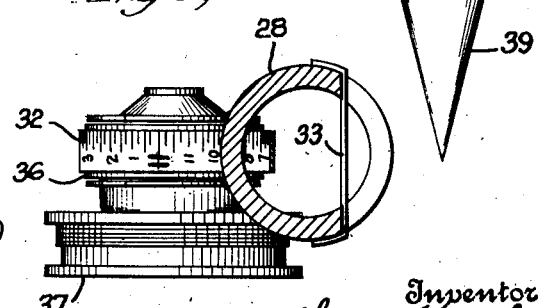
Inventor
Alfred Kinzbach
By his Attorney
R. J. Dearborn

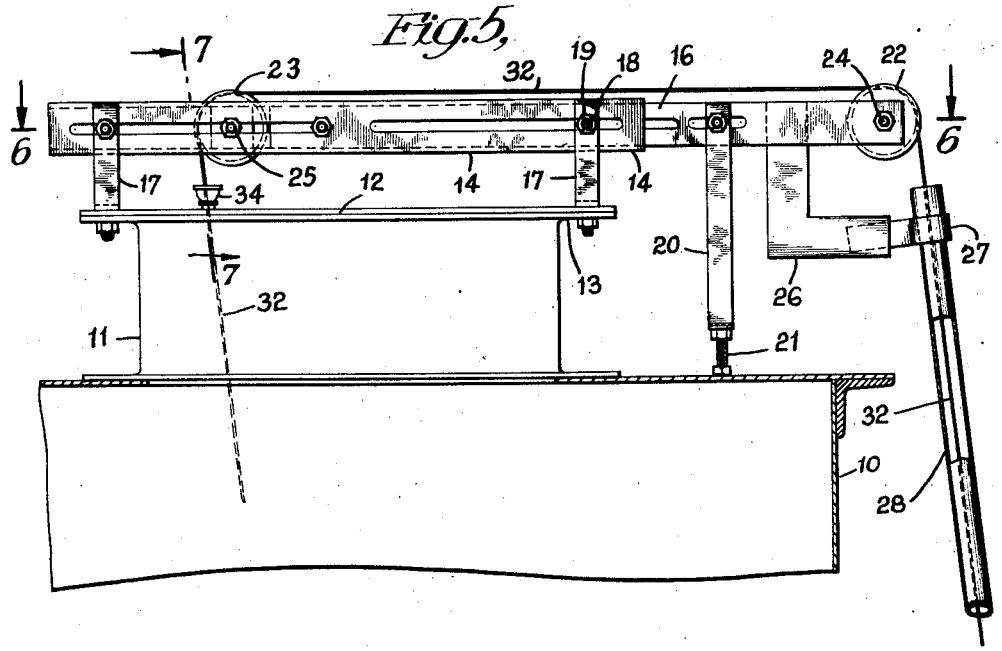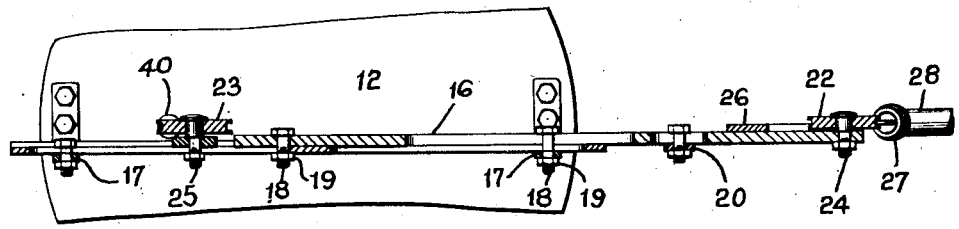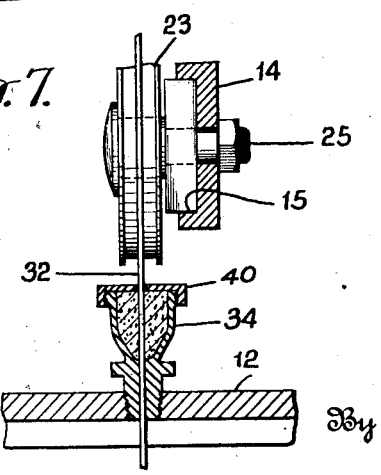

Patented Aug. 28, 1928.

1,682,286

UNITED STATES PATENT OFFICE.

ALFRED KINZBACH, OF SOUR LAKE, TEXAS.

TANK-GAUGING APPARATUS.

Application filed September 16, 1924. Serial No. 737,996.

This invention relates to tank gauging apparatus.

One of the objects of the invention is to provide a tank gauging apparatus for storage tanks for liquid such, for example, as gasoline.

Another object of the invention is to provide a tank gauging apparatus for liquid storage tanks which is readily adjustable and which can be adapted for use on tanks of that its accuracy will not be impaired.

Still another object is to provide a tank gauging apparatus for liquid storage tanks in which provision is made for protecting parts of the device from the elements so that its accuracy will not be impaired.

Another object of the invention is to provide a tank gauging apparatus having means for indicating directly to the operator the height of the column of liquid in the tank.

Other objects and advantages of the invention will appear as the description thereof, when taken in connection with the accompanying drawings, proceeds.

In the drawings:

Fig. 1 is a view in elevation of a portion of a storage tank equipped with a gauging apparatus constructed in accordance with this invention.

Fig. 2 is an enlarged view in side elevation of a portion of the protective piping showing the cut out portion through which readings are taken, and the reels, a portion of one of the reels having broken away to more clearly show a portion of the other.

Fig. 3 is an enlarged view in front elevation of the same portion of the protective piping shown in Fig. 2, and showing the gauge line and plumb bob lines wound on their respective reels.

Fig. 4 is a sectional plan view taken on the line 4—4 of Fig. 2.

Fig. 5 is a view in elevation of the adjustable bracket secured to the tank roof.

Fig. 6 is a sectional plan view taken on the line 6—6 of Fig. 5.

Fig. 7 is a sectional elevation taken on the line 7—7 of Fig. 5.

Referring to the drawings, there is represented at 10 a portion of a storage tank adapted to contain liquid. While the character or type of tank to which the apparatus constituting the present invention can be applied is in no wise limited, a gasoline storage tank will be used as an illustrative example and simply for the purpose of showing one way in which this invention may advantageously be practiced.

The tank 10 is provided with a hatch or hatches 11 (only one of which is shown for the purpose of illustration) communicating with the interior of the tank, and each hatch is equipped with a suitable cover or manhead 12 which is secured to the hatch flange 13 in any convenient manner.

An adjustable bracket is partially supported on and secured to one of the manheads 12. The bracket consists of a bar 14 which is formed with a longitudinal groove 15 in one side, and a second bar 16 adapted to slide in the groove 15 of the bar 14. The bar 14 is supported on a pair of legs 17, inserted in holes or openings in the flange of the manhead. A plurality of these openings is provided so that the bracket may be mounted in any desired position. Both bars are provided with longitudinally disposed slots with bolts 18 extending through the slots in the two bars, and nuts 19 for tightening up on the bolts to secure the bars in the desired position. The end of the outer bar 16 is supported on a leg 20 which rests upon the top of the tank 10 and which is provided with an adjusting screw 21 by means of which the end of the bracket may be raised or lowered at will.

The bars 16 and 14 each support a pulley, 22 and 23 respectively, the pulleys being mounted on pivots 24 and 25. A bracket member 26 formed with an eye 27 is secured as by soldering to the bar 16 and supports the upper end of a pipe 28 which extends down the outside of the tank 10 and which is supported at its lower end by a clamp 29 secured to a swing pipe windlass 30 which is mounted near the bottom of the tank in any suitable manner.

Near the lower end of the pipe 28 an opening 31 is provided where the reading on the gauge line 32 is taken, a brass strip 33 being provided to indicate the point at which the reading is taken. The gauge line 32 extends through the pipe and over the pulleys 22 and 23, through a grease cup 34 which is mounted in the manhole cover 12, and into the tank 10 where a float 35 is secured to the end of the gauge line.

The other end of the gauge line is mounted on a gauge line reel 36 which is welded or otherwise secured to the lower end of the pipe 28. A second reel 37 is mounted for operation with the reel 36 and carries a line or string 38 to the end of which is attached a plumb bob 39. The second reel operates to take up the slack in the gauge line 32 so that a correct reading can be had. In practice it sometimes happens that the plumb bob is moved to the ground, but if before a reading is taken the gauger wraps the plumb bob line a few turns about its reel the weight will be again suspended.

The gauge line 32 is graduated and bears suitable markings as illustrated in Figs. 3 and 4 for indicating the height of the column of liquid in the tank or the line may be calibrated so as to indicate directly the number of gallons of liquid in the tank. The float 35 will, of course, sink deeper in the lighter liquids than in the heavier liquids and in practice it has been found satisfactory to read the indication on top of the brass strip 33 for the lighter liquids, for example, oils having about 30° Bé. gravity, and to use the indication on the bottom of the strip for the heavier oils. If desired, calibrations based on correction for gravity may be indicated on the gauge line so that all readings may be taken from the same edge of the strip 33.

A packing member or grease cup 34 is mounted on the manhead or cover 12 and the gauge line 32 extends through it into the tank. The cup is filled preferably with grease which not only permits a ready movement of the gauge line, but at the same time constitutes a seal preventing the escape of gases from the tank. The grease cup 34 is provided with a cap 40 having a central orifice through which the gauge line passes. The cap 40 may be secured to the cup 34 in any desired manner as by being screwed thereon, as clearly shown in Fig. 7.

From the foregoing it is clear that when it is desired to mount the apparatus upon a storage tank, the apparatus can be readily adjusted to fit almost any type of tank. The length of the bracket can be adjusted so as to fit manhead covers of varying diameters and the inclination of the roof of storage tanks can be compensated for by means of the adjusting screw 21. It is clear from the foregoing that the plumb bob 39 while suspended in the air will always maintain the gauge line 32 taut so that a correct reading can be obtained. The pipe 28 protects the gauge line 32 from the elements and more particularly from the wind so that the line is not flopping back and forth and making it difficult to take an accurate reading.

Apparatus of preferred form and construction has been illustrated and described for the purpose of showing a way in which this invention may be practiced, but the inventive thought upon which this application is based is broader than this illustrative embodiment thereof. It is, therefore, understood that the scope of the invention is not limited by the present disclosure, reference being had to the appended claims for that purpose.

What I claim is:

1. In combination with a tank having a hatch and a cover therefor, a packing member mounted on said cover, an adjustable bracket secured on said cover with one end thereof projecting beyond the edge of said tank, a gauge line mounted on said bracket, one end thereof extending through said packing member into said tank, a float on one end of said line, a reel secured outside said tank and to which the other end of said gauge line is secured, a second reel operatively connected to the first named reel, and an independent weighted line attached to said second reel and adapted to reel up any slack in the gauge line.

2. Gauging apparatus for storage tanks, comprising a gauge line, a float on the end of the gauge line within the tank, an adjustable bracket on the tank for supporting the gauge line, movable members on said bracket permitting free movement of the gauge line, means disposed on the side of the tank for protecting a portion of the gauge line from the elements and having an opening therein through which the gauge line may be seen, and means for reeling up the gauge line as the float rises in the tank.

3. Measuring apparatus for tanks, comprising an adjustable bracket secured to the top of said tank with one end of said bracket projecting beyond the edge of said top, a graduated gauge line supported on said bracket, a float secured to one end of said line, means for protecting an extended portion of the gauge line from the elements including a vertically disposed pipe secured to the outside of the tank and provided with an opening near its lower end through which readings may be taken, and means for taking up slack in the line.

4. Measuring apparatus for tanks comprising, a gauge line having one end thereof extending into the tank, a float attached to the end of the gauge line within the tank, an adjustable bracket on the cover of the tank for supporting the gauge line, a reel to which one end of the gauge line is secured disposed on the outside of the tank for taking up slack in the gauge line, a second and relatively larger reel operatively secured to the first reel, an independent line wound on the larger reel with one end secured thereto, and a suspended weight on the other end of the independent line adapted to actuate the smaller reel to wind up any slack in the gauge line.

In witness whereof I have hereunto set my hand this 2nd day of September, 1924.

ALFRED KINZBACH.

CERTIFICATE OF CORRECTION.

Patent No. 1,682,286. Granted August 28, 1928, to

ALFRED KINZBACH.

It is hereby certified that error appears in the printed specification of the above numbered patent requiring correction as follows: Page 1, line 11, strike out the words "that its accuracy will not be impaired" and insert instead varying sizes and dimensions; and that the said Letters Patent should be read with this correction therein that the same may conform to the record of the case in the Patent Office.

Signed and sealed this 20th day of January, A. D. 1931.

(Seal)

M. J. Moore,
Acting Commissioner of Patents.